US008498264B2

(12) United States Patent
Ryu

(10) Patent No.: US 8,498,264 B2
(45) Date of Patent: Jul. 30, 2013

(54) HANDOFF METHOD IN A HIGH-RATE PACKET DATA MOBILE COMMUNICATION SYSTEM

(75) Inventor: Hwan-Chul Ryu, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1630 days.

(21) Appl. No.: 10/547,801

(22) PCT Filed: Feb. 26, 2004

(86) PCT No.: PCT/KR2004/000396
§ 371 (c)(1),
(2), (4) Date: Jul. 3, 2006

(87) PCT Pub. No.: WO2004/079947
PCT Pub. Date: Sep. 16, 2004

(65) Prior Publication Data
US 2006/0274692 A1   Dec. 7, 2006

(30) Foreign Application Priority Data
Mar. 5, 2003   (KR) .................. 10-2003-0013584

(51) Int. Cl.
*H04W 80/04*   (2009.01)
(52) U.S. Cl.
USPC ........... 370/331; 370/332; 370/333; 370/338; 370/328; 370/229; 455/432.1; 455/432.3; 455/435.1; 455/436
(58) Field of Classification Search
USPC ................. 455/432.1, 433, 435.1, 436–439; 370/331–333, 38, 328, 229; 709/228, 249, 709/229, 203
See application file for complete search history.

(56) References Cited

U.S. PATENT DOCUMENTS

2002/0196749 A1* 12/2002 Eyuboglu et al. ............. 370/328
2003/0145091 A1*  7/2003 Peng et al. ..................... 709/229
2003/0223427 A1* 12/2003 Chang et al. ............... 370/395.3

FOREIGN PATENT DOCUMENTS

| EP | 1 079 653 | 2/2001 |
| KR | 2003/0023939 | 3/2003 |
| WO | WO 01/67786 | 9/2001 |

OTHER PUBLICATIONS

Anonymous, "1Xev-DO Inter-Operability Specification (IOS) for CDMA 2000 Access Network Interface", 3GPP2 A.S0007 Ballot Version, Release 0, Jun. 14, 2001.

* cited by examiner

*Primary Examiner* — Kiet Doan
*Assistant Examiner* — Dung Lam
(74) *Attorney, Agent, or Firm* — Roylance, Abrams, Berdo & Goodman, L.L.P.

(57) ABSTRACT

Disclosed is a session handoff method of an access terminal (AT) in a high-rate packet data (HRPD) mobile communication system. The session handoff method comprises performing a close procedure of a session in negotiation upon receiving a close request for a session negotiation from the AT performing session handoff; allocating a new unicast access terminal identifier (UATI) to the AT upon receiving a request for allocation of a new UATI from the AT after the session close procedure; and acquiring prior session information from a source session controller using an old UATI included in received prior session information upon receiving configuration information including the prior session information from the AT after allocating a new UATI to the AT.

10 Claims, 5 Drawing Sheets

HANDOFF METHOD IN A HIGH-RATE PACKET DATA MOBILE COMMUNICATION SYSTEM

BACKGROUND OF THE INVENTION

1. Field of the Invention

The present invention relates generally to a handoff method in a mobile communication system, and in particular, to a handoff method in a High-Rate Packet Data (HRPD) mobile communication system.

2. Description of the Related Art

In general, a mobile communication system transmits and receives information over a radio channel in order to provide mobility to an access terminal. Such a mobile communication system has evolved from a system that basically supports a voice service into a system that can transmit and receive packet data. For the system that can transmit and receive packet data, a system that transmits simple short messages and small amounts of Internet service data is currently used. In addition, in order to meet users' demands for data service, the mobile communication system has evolved into a High-Rate Packet Data (HRPD) mobile communication system, called a 1x EV-DO mobile communication system. Currently, the 1x EV-DO mobile communication system is being used.

With reference to FIG. 1, a description will now be made of configuration and operation of a conventional HRPD mobile communication system. FIG. 1 is a diagram illustrating configuration of an HRPD mobile communication system.

An access terminal (AT) 101 can perform data communication with an access network transceiver system (ANTS) over a radio channel. Access network controllers (ANCs) 110 and 120 are connected to a plurality of ANTSs 11 to 1N and 21 to 2N, respectively, and control their associated ANTSs. The ANC can constitute a subnet independently or as one access network (AN), or two or more ANCs can constitute a subnet as one AN. Such an AN-based subnet is identified through a unique subnet mask prepared in the ANC. Since the subnet mask is comprised of 128 bits, the subnet can also be identified through a color code comprised of fewer bits. The ANCs 110 and 120 have session controllers 111 and 121, respectively. Each of the session controllers 111 and 121 assigns a unicast access terminal identifier (UATI) to an AT located in an ANC connected thereto, and manages session information corresponding to the AT.

The ANCs 110 and 120 can be connected to a data core network (DCN) 150 directly or via another specific ANC. The DCN 150 is connected to the ANC via a packet data service node (PDSN) 151. A detailed description of the DCN 150 will not be given. The ANCs 110 and 120 can be connected to an access network-authentication, accounting and authorization (AN-AAA) system 160 independently or indirectly via a specific AN-AAA system.

With reference to FIG. 2, a description will now be made of a handoff method in such an HRPD mobile communication system. FIG. 2 is a signaling diagram during handoff of an AT in an HRPD mobile communication system.

In an HRPD mobile communication system, session information of subscribers is stored in the session controller 111. Therefore, handoff occurs when session information is turned over. That is, handoff takes place when session information of an AT is transferred to a session controller of another ANC, and in this way, history of the AT is continuously maintained. Such a session-related handoff standard is defined as A13 in IS-878, a 1x EV-DV standard. Such a handoff procedure will now be described with reference to FIG. 2.

In FIG. 2, the ANC 120 to which the AT 101 first belongs is called a source ANC, and a session controller (SC) 121 connected to the source ANC 120 is called a source SC. In addition, the ANC 110 to which the AT 101 is to move is called a target ANC, and the session controller 111 connected to the target ANC 110 is called a target SC. The signaling procedure of FIG. 2 will now be described.

The AT 101 can detect a change of ANC through check of a subnet mask or check of a color code. Upon detecting the change of ANC, the AT 101 transmits a UATI Request signal UATIRequest to the target ANC 110 in step 200. At this point, the AT 101 transmits a subnet mask or a color code of an ANC to which it previously belonged, together with an old UATI. Upon receiving the UATI Request signal, the target ANC 110 transmits in step 202 a UATI Allocate Request signal UATIAllocateReq to the target SC 111 along with the subnet mask or color code and the UATI. The target SS 111 can identify the source SC 121 using the received subnet mask or color code. After identifying the source SC 121, the target SC 111 transmits in step 204 an A13 Session Information Report message based on an A13 standard to the source SC 121.

Upon receiving the A13 Session Information Report message, the source SC 121 transmits in step 206 an A13 Session Information Response message to the target SC 111 along with session information for a call of a corresponding AT that received the information, and subscriber information. Such an A13 Session Information Response message includes a message sequence value. If the A13 Session Information Response message is received in step 206, the target SC 111 allocates again a UATI for the AT 101 in step 208. Further, in step 208, the target SC 111 generates the newly allocated UATI as a UATI Allocate Response signal UATIAllocateRsp and sends the generated UATI Allocate Response signal to the target ANC 110. At this point, if IP Address and Access Network Identifier parameters of a PDSN are received from the source SC 121, the target SC 111 sends the UATI Allocate Response signal UATIAllocateRsp to the target ANC 110 along with the received parameters. Because a UATI of the AT 101 was newly assigned, the target ANC 110 sends in step 210 a UATI Assignment signal UATIAssignment to the AT 101 to inform the AT 101 of the newly assigned UATI. If a UATI is newly assigned in this way, the AT 101 stores the newly assigned UATI. Thereafter, in step 212, the AT 101 sends a UATI Complete signal UATIComplete to the target ANC 110 to indicate that the UATI has been correctly assigned.

Upon receiving the UATI Complete signal UATIComplete, the target ANC 110 generates in step 214 a UATI Complete Request signal UATICompleteReq and sends the generated UATI Complete Request signal to the target SC 111. Upon receiving the UATI Complete Request signal, the target SC 111 generates in step 216 a UATI Complete Response signal UATICompleteRsp and sends the generated UATI Complete Response signal to the target ANC 110. Then the target ANC 110 and the AT 101 perform a Location Update procedure in step 218. Further, in step 220, the target SC 111 generates an A13 Session Information Confirm signal according to an A13 standard and sends the generated A13 Session Information Confirm signal to the source SC 121. Upon receiving the A13 Session Information Confirm signal, the source SC 121 deletes a database (DB) for the corresponding AT.

As described above, many signaling procedures are performed while the AT 101 requests a UATI upon detecting movement of its position and then is assigned a UATI in response to the request. In addition, even after the UATI is assigned, signals must be exchanged between the target ANC 110 and the AT 101 during the Location Update procedure, and signals should also be exchanged between the session controllers.

However, in some cases, an AT fails to receive pilot signals from a target ANC and a source ANC while performing handoff. Such a case takes place when the AT fails to receive a pilot signal as the AT is powered off or a channel condition becomes poor during handoff. When the AT fails to acquire a pilot signal received from the source ANC and the target ANC during handoff like this, the AT fails in handoff.

In case of the handoff failure, the AT must perform a process related to initial location registration when it acquires again a pilot signal. That is, the AT must restart session negotiation performed during the initial location registration from the beginning. In this case, even if only 3 protocols of 'session configuration protocol', 'stream protocol' and 'idle state protocol' are assumed as attribute protocols performed for session negotiation, the AT must newly perform negotiation and determine available protocols at each session. Even if only 3 protocols are assumed like this, when session negotiation is newly performed, the number of messages exchanged between an AT and an access network (AN) in which an ANTS is included must be 7. This is because each message requires a configuration request message and its associated configuration response message, and when the negotiation is completed, it must include a configuration complete message.

That is, in case of handoff failure, so many messages must be exchanged increasing a system load. As a result, available resources in the system are exhausted. In addition, when so many messages are exchanged like when the AT is initially powered on, a user may feel tedious resulting in deterioration in service quality.

SUMMARY OF THE INVENTION

It is, therefore, an object of the present invention to provide a method for correctly performing handoff even in a poor radio environment.

It is another object of the present invention to provide a handoff method for reducing an operation load of an HRPD mobile communication system.

It is further another object of the present invention to provide a safe handoff method in an HRPD mobile communication system.

To achieve the above and other objects, there is provided a session handoff method of an access terminal (AT) in a high-rate packet data (HRPD) mobile communication system. The session handoff method comprises performing a close procedure of a session in negotiation upon receiving a close request for a session negotiation from the AT performing session handoff; allocating a new unicast access terminal identifier (UATI) to the AT upon receiving a request for allocation of a new UATI from the AT after the session close procedure; and acquiring prior session information from a source session controller using an old UATI included in received prior session information upon receiving configuration information including the prior session information from the AT after allocating a new UATI to the AT.

Preferably, the step of acquiring session information from a previous session controller comprises the step of sending a session information request message based on an A13 standard to the source session controller, and receiving a session information response message based on the A13 standard.

The session handoff method further comprises the step of performing a location update procedure on the AT between a target access network controller (ANC) and the AT after acquiring the previous session information.

To achieve the above and other objects, there is provided a handoff method in an access terminal (AT) capable of communicating with a high-rate packet data (HRPD) mobile communication system. The handoff method comprises completing session negotiation when the AT acquires again a pilot signal after a failure to receive a pilot signal while performing session handoff; sending a UATI allocate request to the HRPD mobile communication system after completing the session negotiation; and sending information on a position where prior session information is stored to the HRPD mobile communication system, upon receiving a UATI allocate response from the HRPD mobile communication system.

The handoff method further comprises the step of performing a location update procedure with the HRPD mobile communication system after sending information on the position where prior session information is stored.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF AN EXEMPLARY EMBODIMENT

Figure 1:
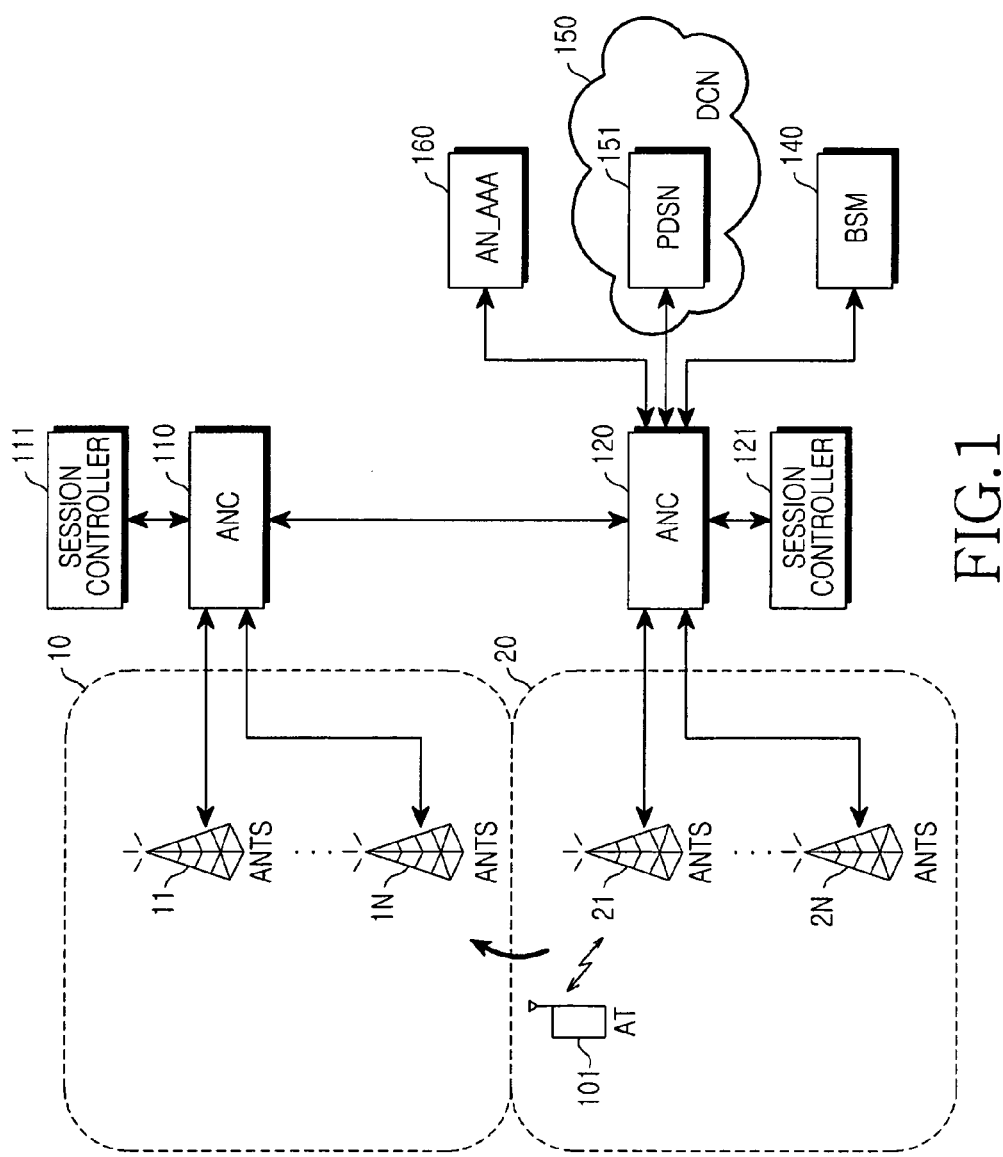
FIG. 1 is a diagram illustrating configuration of a high-rate packet data (HRPD) mobile communication system.
Figure 2:
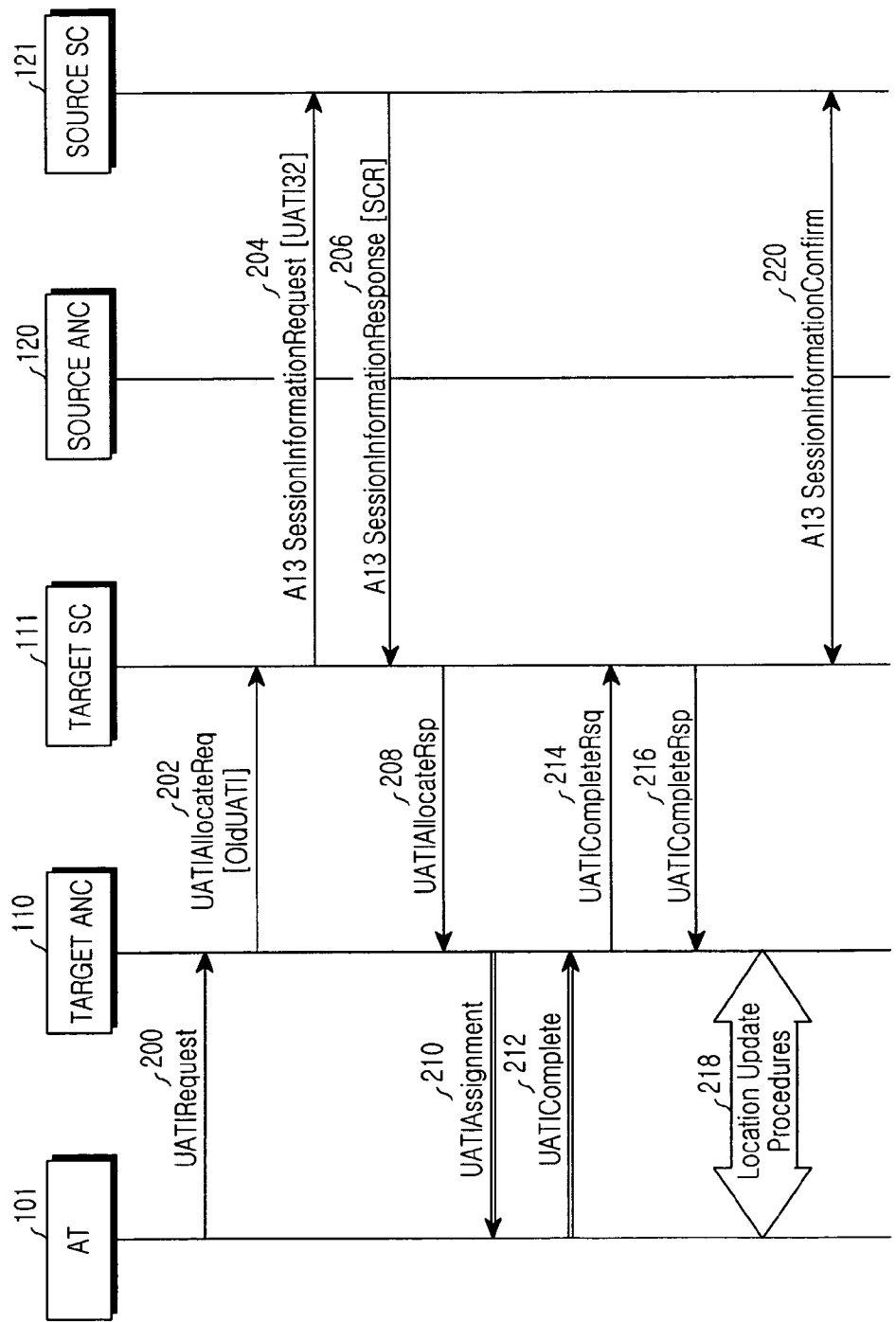
FIG. 2 is a signaling diagram during handoff of an access terminal (AT) in an HRPD mobile communication system.

An exemplary embodiment of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for conciseness.

Figure 3A:
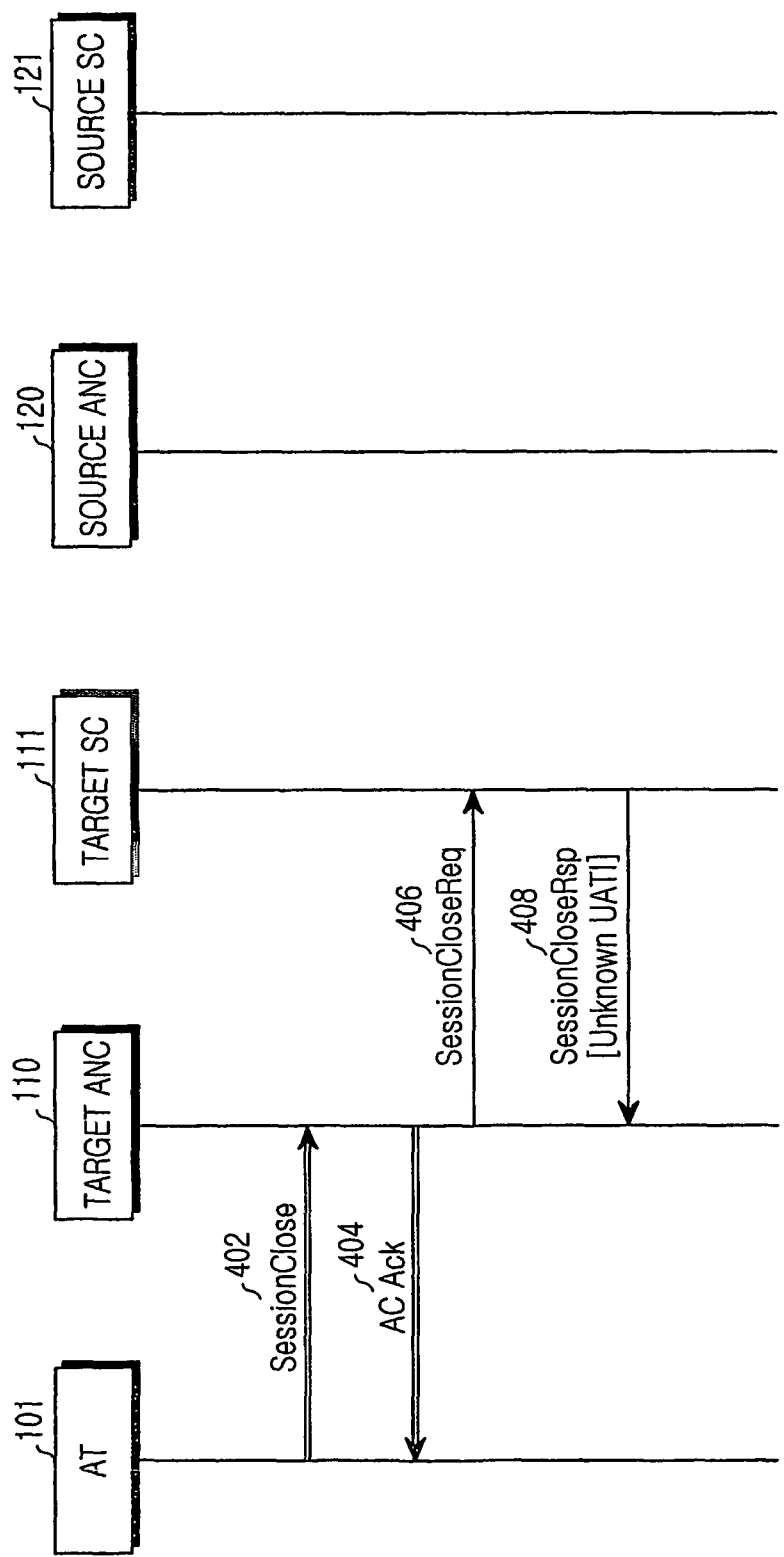
FIGS. 3A to 3C are signaling diagrams for performing a handoff in an HRPD mobile communication system according to an embodiment of the present invention.
Figure 3B:
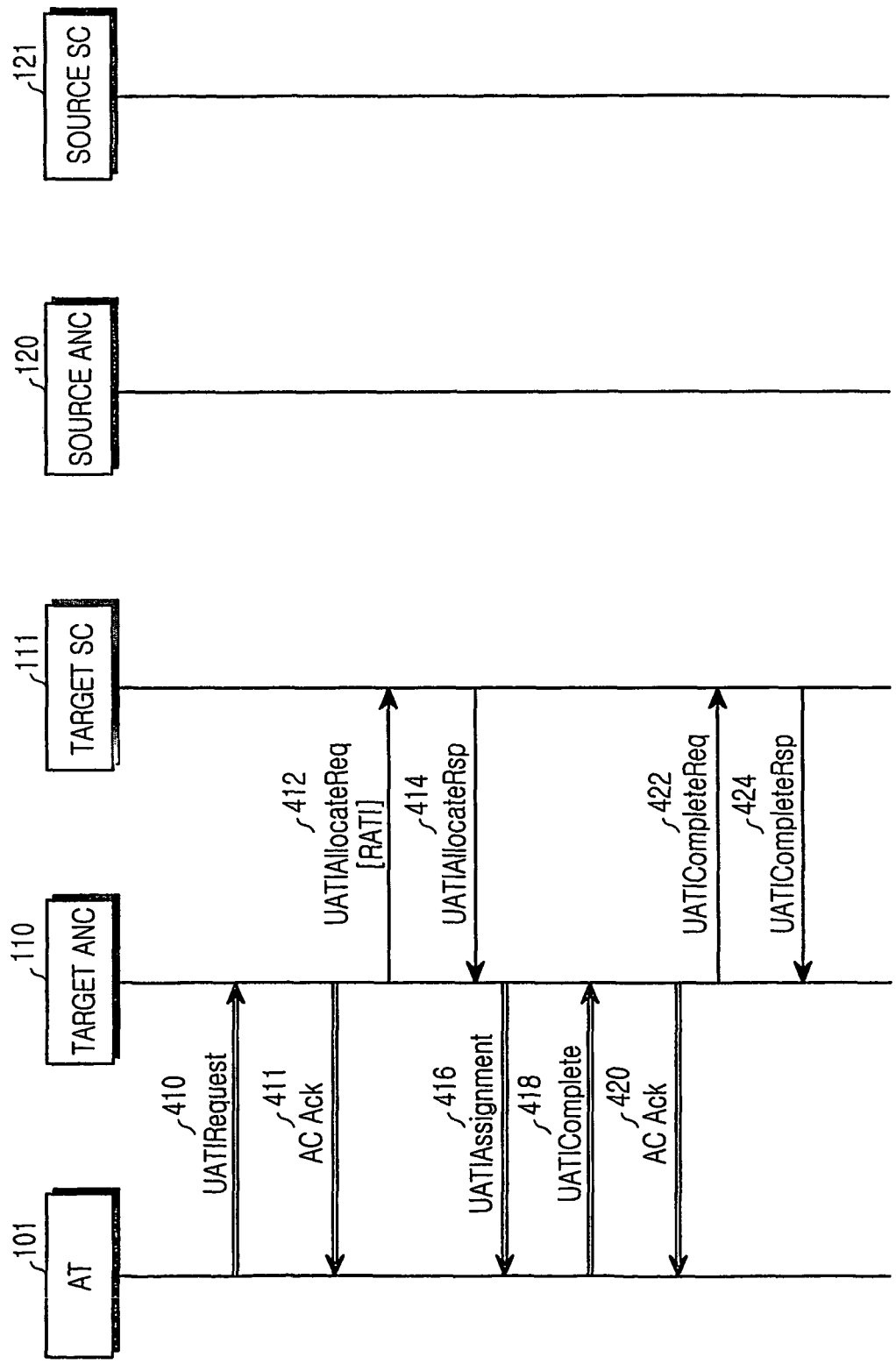
Figure 3C:
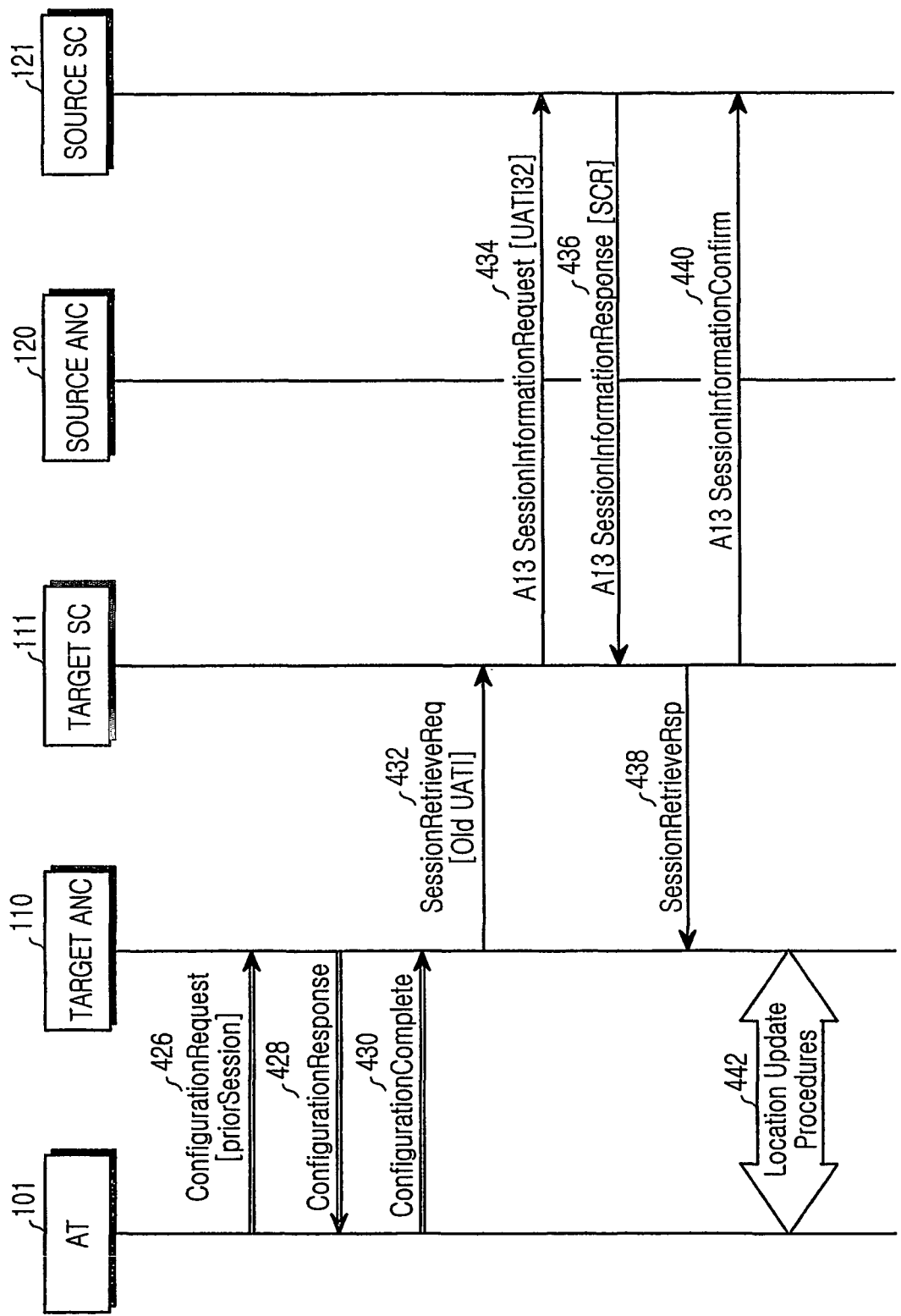

FIGS. 3A to 3C are signaling diagrams for performing a handoff in an HRPD mobile communication system according to an embodiment of the present invention. With reference to FIGS. 3A to 3C, a detailed description will now be made of a process of performing handoff based on a handoff signaling flow in an HRPD mobile communication system according to an embodiment of the present invention.

It is assumed herein that an AT 101 fails to receive all pilot signals transmitted from a source ANC 120 and a target ANC 110 when it moves from the source ANC 120 to the target ANC 110, i.e., while performing handoff. Such a case occurs due to power off or poor channel environment as described in the prior art section. In addition, the AT 101 detects a change of subnet in the method descried in the prior art section. If the AT 101 detects a pilot signal again after a failure to detect a pilot signal due to the poor channel environment, the AT 101 generates in step 402 a Session Close message SessionClose for closing a current ongoing session and transmits the generated Session Close message to the target ANC 110.

When the Session Close message is transmitted due to a change of subnet, the target ANC 110 generates in step 404 an acknowledgement message AC_Ack indicating normal receipt of the Session Close message and sends the generated acknowledgement message to the AT 101. Thereafter, in step 406, the target ANC 110 generates a Session Close Request message SessionCloseReq indicating a close of the session and sends the generated Session Close Request message to a target SC 111. In response, the target SC 111 closes the set session.

In this state, the target SC 111 has not yet performed normal subnet handoff based on the A13 standard due to a pilot loss or movement of the AT 101. Therefore, the target SC 111 sends in step 408 the target ANC 110 a message indicating that it has no session configuration information for the AT 101. The message transmitted at this time becomes a Session Close Response message SessionCloseRsp.

Thereafter, the AT 101 detects its current subnet information, i.e., subnet information stored therein before handoff, and a new subnet. This is possible because the AT 101 is an AT which was in a handoff situation. When an AT which was in the handoff situation receives a new pilot signal again after a failure to receive a pilot signal before completion of handoff, the AT detects that a pilot signal received from the subnet is a new pilot signal. In some cases, if the AT 101 detects again a pilot signal after a failure to receive a pilot signal from the target ANC 110, then the AT 101 generates in step 410 a UATI Request message UATIRequest and transmits the generated UATI Request message to the target ANC 110.

In step 411, the target ANC 110 sends an acknowledgement message AC_Ack over a control channel set up to the AT 101 in order to indicate normal receipt of the UATI Request message. Thereafter, in step 412, the target ANC 110 generates a UATI Allocate Request message UATIAllocateReq and sends the generated UATI Allocate Request message to the target SC 111 in order to allocate UATI of the AT 101. In this state, because the UATI has not been allocated yet for the AT 101, the AT 101 is identified using a random access terminal identification (RATI) before until allocation of the UATI. Then the target SC 111 allocates a UATI of the corresponding AT 101 in response to the UATI Allocate Request message UATIAllocateReq received in step 412. Thereafter, in step 414, the target SC 111 generates a UATI Allocate Response message UATIAllocateRsp using the allocated UATI and transmits the generated UATI Allocate Response message to the target ANC 110.

Upon receiving the UATI of the AT 101 in this way, the target ANC 110 transmits in step 416 a UATI Assignment message UATIAssignment to the AT 101 to inform the AT 101 of assignment of the UATI. Then the AT 101 stores UATI information included in the UATI Assignment message received in step 416. Thereafter, in step 418, the AT 101 sends a UATI Complete message UATIComplete to the target ANC 110. Then the target ANC 110 generates in step 420 an acknowledgement message AC_Ack indicating normal receipt of the UATI Complete message, and transmits the generated acknowledgement message to the AT 101 over a control channel set up to the AT 101.

Thereafter, in step 422, the target ANC 110 generates a UATI Complete Request message UATICompleteReq and sends the generated UATI Complete Request message to the target SC 111. In response, the target SC 111 must inform the target ANC 110 of normal receipt of the UATI Complete Request message. For this, the target SC 111 generates in step 424 a UATI Complete Response message UATICompleteRsp and sends the generated UATI Complete Response message to the target ANC 110.

When the AT 101 newly receives a pilot channel after a failure to receive a pilot channel during handoff, the AT 101 is assigned a new UATI as stated above. In this state, the AT 101 knows that its session information exists in a previous session controller, i.e., a source SC 121, due to a failure of the current handoff. Therefore, the AT 101 performs the following operation instead of newly performing session negotiation, according to an embodiment of the present invention.

In step 426, the AT 101 informs the target ANC 110 that it has failed subnet handoff but has session information managed in the source SC 121. Even in the case where an AT receives a pilot signal after a failure to receive a pilot signal due to a poor radio environment, the same operation is performed. Therefore, the AT 101 transmits to the target ANC 110 a Configuration Request message ConfigurationRequest including along with information indicating that session information acquired through negotiation with the source ANC 120 is included in the source SC 121. Here, the Configuration Request message includes predetermined information capable of indicating prior information contained therein.

Upon receiving the Configuration Request message, the target ANC 110 stores an old UATI, and then generates in step 428 a Configuration Response message ConfigurationResponse and sends the generated Configuration Response message to the AT 101. In reply to the message received in step 428, the AT 101 generates in step 430 a Configuration Complete message ConfigurationComplete indicating completion of assignment negotiation and sends the generated Configuration Complete message to the target ANC 110. Then the target ANC 110 can detect that the AT 101 has session information, using prior Session attribute information transmitted by the corresponding AT 101. Therefore, based on the information, the target ANC 110 generates in step 432 a Session Retrieve Request message using an old UATI of the corresponding AT 101 and sends the generated Session Retrieve Request message to the target SC 111. In response, the target SC 111 generates in step 434 an A13 Session Information Request message based on the A13 standard and transmits the A13 Session Information Request message to the source SC 121.

Upon receiving the A13 Session Information Request message from the target SC 111, the source SC 121 searches for session information among the received information using the old UATI of the corresponding AT 101. Further, the source SC 121 generates an A13 Session Information Response message based on the A13 standard using the searched session information, i.e., session information used by the corresponding AT 101. The source SC 121 transmits in step 436 the A13 Session Information Response message to the target SC 111. Upon receiving the A13 Session Information Response message, the target SC 111 informs the target ANC 110 in step 438 that the A13 Session Information Request has been normally processed and corresponding session information has been stored in a database of the corresponding AT 101.

Thereafter, the target SC 111 generates in step 440 a Session Information Confirm message SessionInformationConfirm indicating normal completion of the A13 process and sends the generated Session Information Confirm message to the source SC 121. After this, the target ANC 110 performs in step 442 a Location Update procedure between the target ANC 110 and the AT 101.

As described above, a handoff method according to an embodiment of the present invention can acquire prior information even in case of handoff failure due to pilot loss caused by a poor radio environment or power off of an AT during subnet handoff in an HRPD mobile communication system, contributing to simplification of a handoff procedure. In addition, the simplification of a handoff procedure can lead to an improvement in system performance and battery power saving.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A session handoff method of an access terminal (AT) in a high-rate packet data (HRPD) mobile communication system, comprising the steps of:
   performing a close procedure of a first session in negotiation upon receiving a close request for a session negotiation from the AT performing a session handoff;
   allocating a new unicast access terminal identifier (UATI) to the AT upon receiving a request for allocation of a new UATI from the AT after the close procedure of the first session;
   receiving configuration information including information on the first session from the AT after allocating the new UATI to the AT; and
   acquiring session information of the first session from a source session controller using an old UATI included in the received session information of the first session.

2. The session handoff method of claim 1, wherein the step of acquiring session information of the first session from the source session controller comprises the step of sending a session information request message based on an A13 standard to the source session controller, and receiving a session information response message based on the A13 standard.

3. The session handoff method of claim 1, wherein the step of acquiring the session information of the first session comprises the steps of:
   transmitting, by the AT, a configuration request message including the old UATI to a target access network controller (ANC);
   sending, by the target ANC which has received the configuration request message, the old UATI to a target session controller;
   transmitting, by the target session controller, a Session Information Request Message including the old UATI to the source session controller;
   searching, by the source session controller, the session information of the first session using the received old UATI;
   transmitting, by the source session controller, a session information Response message including the searched session information of the first session to the target session controller; and
   transmitting, by the target session controller, a Session Information Confirm message indicating reception of the searched session information of the first session to the source session controller.

4. The session handoff method of claim 3, further comprising the step of sending, by the AT, a UATI allocate request to the target ANC and being allocated a new UATI from the target ANC.

5. A system for performing a handoff in a high-rate packet data (HRPD) mobile communication system, comprising:
   an access terminal (AT) for transmitting a close request for closing a first session;
   an access network controller (ANC) for allocating a new unicast access terminal identifier (UATI) to the AT upon receiving a request for allocation of a new UATI from the AT after the close procedure of the first session, receiving configuration information comprising information on the first session from the AT after allocating the new UATI to the AT, and acquiring session information of the first session from a source session controller using an old UATI included in the received session information of the first session.

6. The system of claim 5, further comprising:
   a target session controller for transmitting a session information request message based on an A13 standard to the source session controller, and receiving a session information response message based on the A13 standard.

7. The system of claim 5, wherein the access terminal transmits the old UATI to a target session controller through a target access network controller (ANC) in order to acquire the session information of the first session, the access network controller includes the target session controller for receiving the old UATI from the AT and transmitting a session information request message including the old UATI to the source session controller, and the source session controller for searching for prior session information of the first session using the old UATI received from the target session controller and transmitting a Session Information Response message including the searched session information of the first session to the target session controller.

8. The system of claim 7, wherein the AT sends a UATI allocate request to the target ANC and is allocated a new UATI from the target ANC.

9. The session handoff method of claim 1, further comprising the step of performing a location update procedure on the AT between a target access network controller (ANC) and the AT after acquiring the session information of the first session.

10. The system of claim 5, wherein the ANC performs a location update procedure on the AT between a target access network controller (ANC) and the AT after acquiring the session information of the first session.

* * * * *